Figure 1:
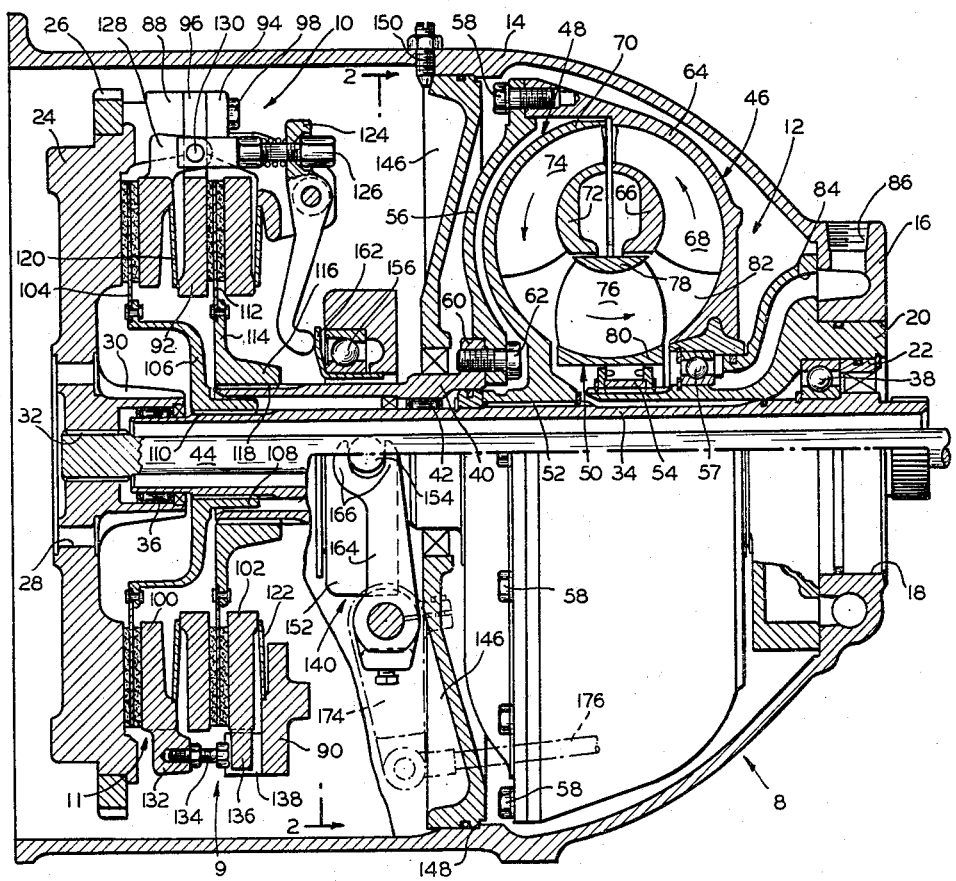

Jan. 21, 1964 W. R. HOWARD ETAL 3,118,524
TRANSMISSION
Filed Jan. 12, 1961 3 Sheets-Sheet 1

INVENTORS
WAYNE R. HOWARD
BARRY L. FROST
BY
Kenneth C. Witt
ATTORNEY

Jan. 21, 1964 W. R. HOWARD ETAL 3,118,524
TRANSMISSION

Filed Jan. 12, 1961 3 Sheets-Sheet 2

INVENTORS
WAYNE R. HOWARD
BARRY L. FROST
BY Kenneth C. Witt
ATTORNEY

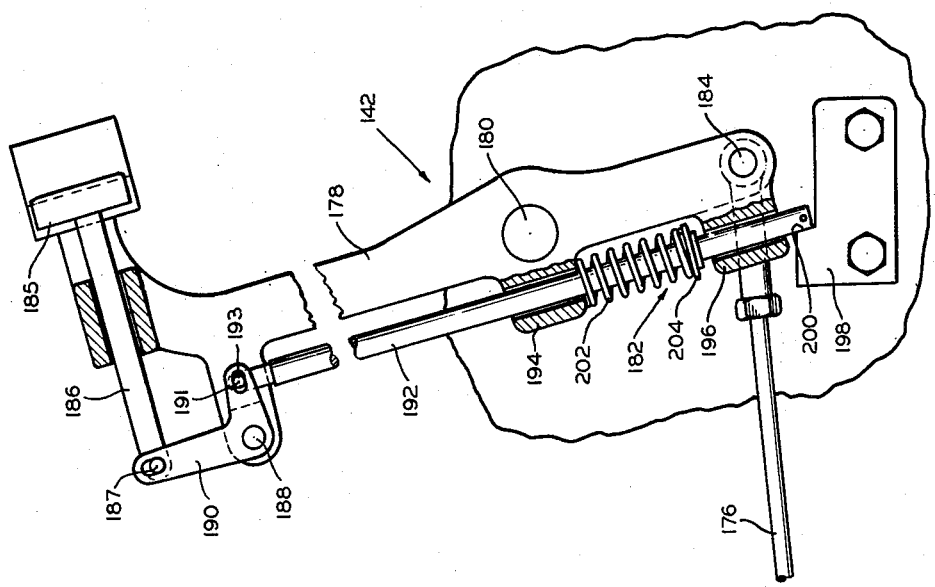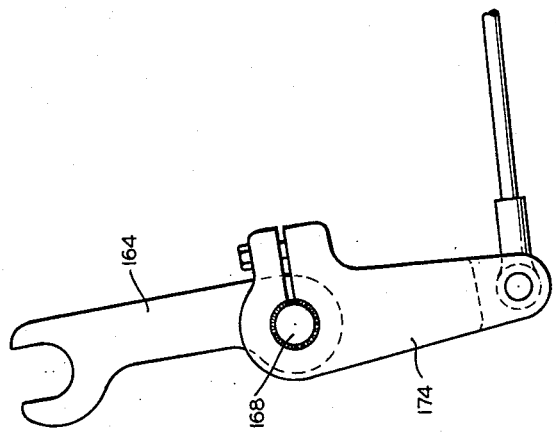

United States Patent Office 3,118,524
Patented Jan. 21, 1964

3,118,524
TRANSMISSION
Wayne R. Howard and Barry L. Frost, Jackson, Mich., assignors to Clark Equipment Company, a corporation of Michigan
Filed Jan. 12, 1961, Ser. No. 82,223
3 Claims. (Cl. 192—3.2)

This invention relates to transmissions, and more specifically to a transmission embodying a sequentially actuatable dual clutch in combination with a hydroynamic torque converter.

As is well known in the art, the efficiency of a hydrodynamic torque converter with a fixed reaction member increases to a maximum, often termed the design point, as the speed ratio between the turbine member and the impeller member increases, and then falls off rapidly thereafter as the speed ratio continues to increase. In order to improve the efficiency of such a hydrodynamic torque converter, it can be provided with an overrunning reaction member so that it will operate as a fluid coupling as the speed ratio increases past a certain point. Since a fluid coupling has a higher efficiency at higher speed ratios nearer 1:1 than a hydrodynamic torque converter, this will result in good efficiency through a greater range of speed ratios; however, the efficiency of a fluid coupling also falls off rapidly after the speed ratio of the turbine member to the impeller member passes a certain point near 1:1. In order to overcome this drop in efficiency it is possible to provide means to lock the turbine member and the impeller member together, thereby providing a direct drive condition.

Transmissions utilizing hydrodynamic torque converters operating in accordance with the foregoing principles have been used previously, but they generally have been relatively large, complex and expensive mechanisms. Consequently, it is a principal object of this invention to provide a compact, easily assembled, low-cost transmission utilizing a hydrodynamic torque converter and a clutch to connect the turbine member and impeller member together.

In carrying out our invention in a preferred embodiment, we combine a hydrodynamic torque converter having an overrunning reaction member with a dual sequentially operated mechanical clutch which initially connects the impeller member of the torque converter to a power source, and then upon further actuation connects the turbine member to the impeller member for rotation therewith while at the same time maintaining the connection between the impeller member and the power source.

Figure 3:
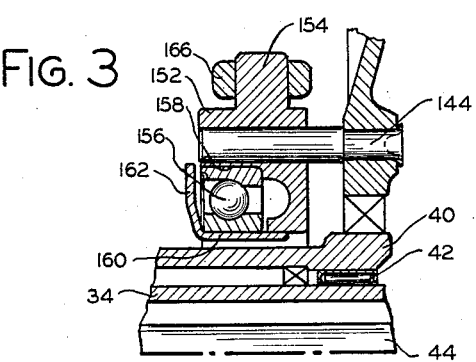
Figure 2:
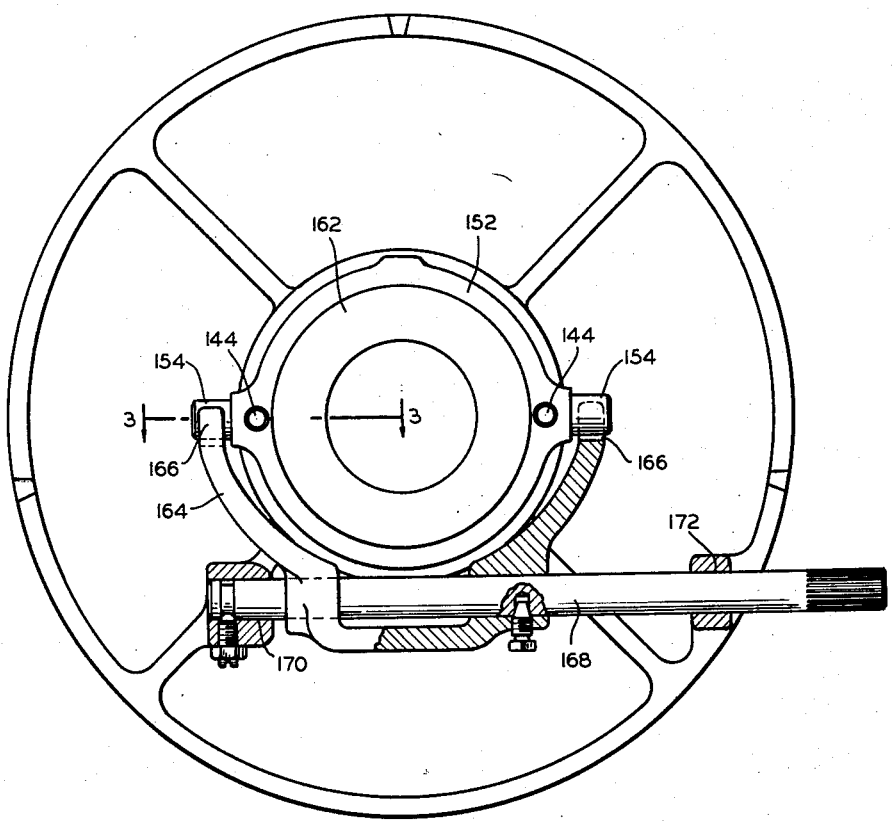

The above and other objects, features and advantages of our invention will be apparent from the following detailed description taken in conjunction with the accompanying drawings in which:

FIGURE 1 is a side elevational view, partially in section, of a transmission embodying this invention, FIGURE 2 is a sectional view along line 2—2 of FIG. 1, FIGURE 3 is a fragmentary sectional view along line 3—3 of FIG. 2, and FIGURE 4 shows the clutch control pedal assembly.

Referring to FIG. 1, there is shown a transmission indicated generally by the numeral 8 and comprising a sequentially actuatable dual friction clutch 10 and a hydrodynamic torque converter 12 disposed within a housing 14 in longitudinally spaced relation. The dual friction clutch 10 includes a first disconnect clutch portion 9 and a second lock-up clutch portion 11, both of which are described in detail hereinafter. The housing 14 has an integral hub portion 16 at the right end (as seen in FIG. 1) with a circular opening 18 therein. Mounted in opening 18 is an inwardly extending stationary reaction sleeve 20 with a circular recessed portion 22.

The clutch 10 has an annular support member 24 which is adapted to connect the transmission 8 to any suitable source of power, not shown, by means of a plurality of circularly arranged holes 28 in cooperation with any suitable connecting means, such as machine screws, whereby member 24 serves as a power input member. The support member 24 has an inwardly extending hub portion 30 and a splined central opening 32 therein. Numeral 26 indicates gear teeth around the periphery of member 24 which may cooperate with the meshing gear (not shown) of a starter mechanism for an internal combustion engine serving as the source of power.

A tubular or sleeve shaft 34 which serves as the output shaft is journaled at one end in the hub portion 30 of the member 24 by means of a needle bearing 36 and is journaled in sleeve 20 by means of a ball bearing 38 disposed between shaft 34 and recess portion 22. A longitudinally extending connecting sleeve 40 is rotatably mounted on shaft 34 by means of needle bearings 42. The sleeve 40 serves to connect clutch 10 with hydrodynamic torque converter 12 as explained in greater detail hereinafter. Coaxially disposed within sleeve shaft 34 is a shaft 44 which serves as a power take-off to drive auxiliary equipment and is splined to member 24 at 32.

The torque converter 12 comprises three vaned elements, namely an impeller 46, a turbine 48, and a reaction member 50. The impeller 46 is coupled, as explained hereinafter, to a source of power and the turbine 48 is splined to output shaft 34 at 52. The reaction member 50 has an overrunning connection to stationary sleeve 20 through the medium of a one-way brake 54.

The impeller 46 is connected to one end of connecting sleeve 40 by a dished driving member 56 and is a rotatably mounted on stationary sleeve 20 by ball bearing 57. The member 56 is attached to impeller 46 by any suitable means, such as machine screws 58 and attached to a radially extending flange portion 60 of connecting sleeve 40 by any suitable means, such as machine screws 62.

The impeller 46 may comprise an outer shell 64 of generally semi-toroidal shape, a core ring 66, and vanes 68 extending between and connected to the shell and core ring. The turbine 48 comprises a semi-toroidal shell 70 and core ring 72 having vanes 74 extending between and secured to the shell and core ring. The reaction member 50 comprises vanes 76 extending between a core ring 78 and a hub 80.

The three vanes elements form and function as a hydrodynamic torque converter with the vanes of the impeller 46 functioning to impart energy to a body of liquid in the toroidal chamber 82 formed by the three vaned elements, and circulate it in the toroidal path indicated by the arrows, the turbine 48 receiving energy from the liquid and the reaction member 50 being held from rotation by the one-way brake 54 and functioning to change the direction of the flow of the liquid so that the device functions to multiply torque until such time that the change in the direction of fluid leaving the turbine 48 and entering the reactor 50 causes the reaction member 50 to be released by the one-way brake 54 to provide a fluid coupling connection between impeller 46 and turbine 48.

The liquid chamber 82 is supplied with liquid through bearing 57 by means of a passage 84 in the stationary reaction sleeve 20 and a passage 86 in hub portion 16, the two passages being in alignment.

The support member 24 has a plurality of axially extending projections 88, preferably three in number, disposed equidistantly around it. These projections 88 serve to carry the remainder of the clutch structure. The clutch 10 comprises, in addition, a retaining and operating arm support ring 90 disposed in longitudinally spaced apart relation from member 24 and an annular member 92 disposed between member 24 and ring 90. The ring 90 and annular member 92 have radially extending projections 94 and 96, respectively, which are in alignment with projections 88 and connected thereto by means of a plurality of machine screws 98. Disposed between support 24 and ring 90 is a pair of pressure plates 100 and 102, one plate being disposed on one side of annular member 92 and the other plate on the other side thereof. Disposed between pressure plate 100 and support 24 is a friction plate 104 which is riveted to a plate carrier 106 having a hub portion 108 splined to shaft 34 at 110 for rotation therewith. A friction plate 112 is disposed between annular member 92 and pressure plate 102 and riveted to a plate support 114 which has a hub portion 116 splined to connecting sleeve 40 at 118. Pressure plate 100 is biased towards member 24 by means of a spring or Belleville washer 120 disposed between pressure plate 100 and annulus 92. Also, pressure plate 102 is biased towards annulus 92 by means of a spring or Belleville washer 122 disposed between ring 90 and pressure plate 102.

The friction plate 112 together with pressure plate 102, annulus 92 which serves as a backing plate and other associated structure forms the aforementioned first clutch portion 9 which, when engaged, serves to connect member 24 to impeller 46. The friction plate 104 together with pressure plate 100, member 24 which serves as the backing plate and other associated structure forms the second clutch portion 11 which serves to connect impeller 46 and turbine 48 for rotation together.

It will be appreciated that dual clutch 10 is normally engaged, that is, friction plates 104 and 112 are held by their respective pressure plates in frictional engagement with member 24 and annulus 92, respectively, to transmit directly to output shaft 34 any torque delivered to member 24.

Pivotally mounted on ring 90 are a plurality, preferably three, operating arms 124. Attached to each operating arm 124 is an adjustable operating rod 126 which is connected at its one end to operating arm 124, as shown, and pivotally connected at its other end to a radially extending projection 128 on pressure plate 100 by means of a pin 130. The above-mentioned structure provides operating means selectively engaging and disengaging the second clutch portion through axial movement of pressure plate 100. The pressure plate 100 also has a plurality of radially extending projections 132, preferably three in number, equidistantly spaced around the periphery thereof. Each of the projections 132 carries an axially extending machine screw 134 for a reason explained hereinafter. The pressure plate 102 has a plurality of radially extending projections 136 in alignment with projections 132 and machine screws 134 and disposed in a slot formed in axially extending bifurcated projections 138 on ring 90. The structure for actuating the second clutch portion plus the additional structure mentioned above cooperates to provide means for selectively engaging or disengaging the first clutch portion through axial movement of pressure plate 102.

Referring now also to FIGURES 2 through 4, the clutch operating arms 124 are actuated by means of an axially movable bearing and collar assembly 140 which is operatively attached to a foot pedal clutch control assembly 142 as explained hereinafter. The bearing and collar assembly 140 is slidably mounted on a pair of parallel axially extending pins 144 which in turn are fixedly mounted in a support ring 146. The support ring 146 is held in place in housing 14 by means of a shoulder 148 and a plurality of cooperating set screws 150 with tapered ends. The bearing and collar assembly 140 comprises a collar 152 slidably disposed on pins 144 and having a pair of radially outwardly extending diametrically disposed trunnions 154. The collar 152 also has a bearing 156 disposed within an annular recess 158 therein. The bearing 156 carries a sleeve 160 having a flange portion 162 which serves as a bearing surface when moved into contact with the adjacent end of operating arms 124.

The bearing and collar assembly 140 is operatively connected to a yoke 164 having bifurcated end portions 166 by means of trunnions 154 which are disposed within the bifurcated portions 166, as shown in FIGURES 1, 2 and 3. The yoke 164 is fixedly attached to a shaft 168 which is journaled in support ring 146 at locations 170 and 172. The shaft 168 extends through housing 14 and has an arm 174 attached to the portion outside housing 14. The arm 174 is connected to the clutch control assembly 142 by means of a connecting rod 176 pivotally connected at one end to arm 174 and pivotally connected at its other end to clutch control assembly 142.

The clutch control assembly 142 comprises a pedal member 178 pivotally mounted on the associated vehicle by means of a pin 180, and a locking mechanism 182 for locking pedal 178 in the center one of three positions, as explained hereinafter. As will be noted, the connecting rod 176 is pivotally attached to pedal 178 by means of a pin 184.

The locking mechanism 182 comprises a small, auxiliary, foot operated release pedal 185 mounted on a rod member 186 which is pivotally connected at 187 to a bell crank 190. The bell crank is pivotally mounted on pedal 178 at 188. The forward projection of bell crank 190 is bifurcated and has pivotally attached thereto by means of a pin 191 in a pair of elongated slots 193 a movable rod 192 slidably mounted in projections 194 and 196 which extend outwardly from pedal 178. The end of rod 192 which is opposite the arm 190 abuts a bracket 198 which has a shoulder portion 200. The rod 192 also has a spring 202 mounted thereon and disposed between projection 194 and a stop 204 on rod 192 which serves to bias rod 192 into abutment with bracket 198.

I will now explain the operation of my invention. In order to disengage the transmission from direct drive as shown in FIG. 1, the clutch pedal 178 is depressed or rotated counterclockwise by an operator to the position shown in FIG. 4. This results in a like counterclockwise movement of yoke 164 which moves bearing and collar assembly 140 to the left, thus rotating operating arms 124 clockwise about their pivot point. Such movement of arms 124 initially causes pressure plate 100 to move to the right, thereby disengaging the second clutch portion 11. Further rightward movement of pressure plate 100 caused by further counterclockwise movement of pedal 178 then brings screws 134 into contact with projections 136 and hence causes pressure plate 102 to also move to the right, thus disengaging the first clutch portion 9. At this point no torque is transmitted from member 24 to output shaft 34.

Now, by releasing pedal 178 to the position shown in FIG. 4, the Belleville washer 122 actuates pressure plate 102 to the left sufficiently to engage friction disc 112 so that impeller member 46 is operatively connected to member 24. Since rod 192 abuts shoulder 200 and prevents pedal 178 from moving past the position shown in FIG. 4, the pressure plate 100 is held from engaging friction disc 104. In this condition the member 24 is connected to output shaft 34 through torque converter 12 which acts to multiply torque therebetween in the lower speed ratios and serves as a fluid coupling as the speed ratio increases and the reaction element begins to overrun.

In order to connect impeller 46 to turbine 48 for direct drive, release pedal 185 is depressed thereby withdrawing rod 192 from abutment with shoulder 200 and thus permitting a further clockwise movement of pedal 178. This allows further leftward movement of pressure plate 100 caused by the bias of spring washer 120 into engagement with friction disc 104. In this condition the impeller 46 and turbine 48 are connected for rotation together, so there is a direct drive between flange 24 and output shaft 34.

It will be appreciated from the foregoing that this invention fulfills the objects set out hereinbefore. The specific transmission described and illustrated herein is adapted particularly for use in farm tractors wherein under certain conditions it is desirable to have a torque converter in the drive train but wherein it is also desirable whenever possible to be able to lock up the torque converter in order to achieve maximum efficiency. In such a vehicle it is also important that the torque converter lockup clutch be disengaged whenever the disconnect clutch is disengaged, and the present invention provides automatically for such operation.

While the preferred form of the invention disclosed herein includes a hydrodynamic torque converter having an overrunning reaction member, the invention is not limited to such an application and may be utilized with equal facility in connection with a torque converter having a fixed reaction member. Moreover, while we have disclosed a preferred form of our invention suitable for foot pedal operation, it will be apparent to persons skilled in the art that the mechanism of this invention can be operated in other ways if desired.

Thus, while we have disclosed a preferred form of our invention, modifications may be made and it should be understood, therefore, that we intend to cover by the appended claims all such modifications falling within the true spirit and scope of our invention.

We claim:

1. A transmission comprising, an elongated housing having a stationary reaction sleeve fixedly attached thereto and projecting inwardly from one end of the housing, a rotatable input member located within the said housing near the other end thereof and having an inwardly projecting hub portion, a rotatable output shaft journaled in said hub portion at its one end and in said housing, a connecting sleeve rotatably mounted on said output shaft, a hydrodynamic torque converter disposed within said housing coaxial with respect to the said output shaft, said torque converter comprising an impeller element operatively connected to said connecting sleeve, a turbine element attached to said output shaft for rotation therewith and a reaction element, said reaction element being operatively attached to said stationary reaction sleeve by means of a one-way brake arranged to release said reaction element for rotation in the same direction as said turbine element, a dual friction clutch mechanism disposed within said housing in coaxial relation with the said output shaft, said clutch mechanism having a first clutch portion actuatable to operatively connect said input member to said connecting sleeve for rotation of said impeller member with the input member and a second clutch portion actuatable to operatively connect said input member to said output shaft for rotation therewith following connection of said connecting sleeve to said input member and means for actuating said clutch portions comprising a bearing and collar assembly operatively connected to said clutch portions and disposed between said clutch and said torque converter, said assembly being mounted for reciprocal axial movement, a yoke operatively connected to said assembly, a rockable shaft connected to said yoke and pivotally journaled in said housing, a lever arm fixedly attached to said last-mentioned shaft, and a pedal assembly operatively connected to said arm.

2. A transmission as specified in claim 1 in which said pedal assembly comprises a pivotal foot pedal having a pair of outwardly extending projections, a rod slidably mounted in said projections, a bracket having a shoulder, said shoulder and rod cooperating to normally limit the movement of said foot pedal in one direction, spring means normally biasing said rod into contact with said bracket, a bell crank pivotally mounted on said pedal and operatively connected at one end to said rod and a release pedal slidably mounted in said foot pedal and operatively connected to said bell crank at its other end for moving said rod out of contact with said bracket.

3. A transmission comprising an input member, an output member, a hydrodynamic torque converter having an impeller element, a turbine element connected to said output element for rotation therewith and a reactor element, a dual clutch having sequentially actuatable first and second clutch portions, said first clutch portion being actuatable to operatively connect said input member to the impeller element of said torque converter, said second clutch portion being actuatable to connect said input member directly to said output member, pedal means operatively connected to said clutch portions for actuating them, said pedal means being pivotal between one extreme position in which both said clutch portions are engaged and another extreme position in which both said clutch portions are disengaged, and means for holding said pedal means in a position intermediate its extreme positions and in which intermediate position said first clutch portion is engaged and said second clutch portion is disengaged.

References Cited in the file of this patent

UNITED STATES PATENTS

| | | |
|---|---|---|
| 2,613,503 | Syrovy | Oct. 14, 1952 |
| 2,619,848 | Carnagua | Dec. 2, 1952 |
| 2,694,948 | McFarland | Nov. 23, 1954 |
| 2,700,444 | Ahlen | Jan. 25, 1955 |
| 2,713,798 | Herndon | July 25, 1955 |
| 2,764,269 | Schjolin | Sept. 25, 1956 |
| 2,969,131 | Black et al. | Jan. 24, 1961 |